No. 644,815. Patented Mar. 6, 1900.
G. COMFORT.
HAY OR STRAW CUTTER.
(Application filed Dec. 22, 1899.)
(No Model.)
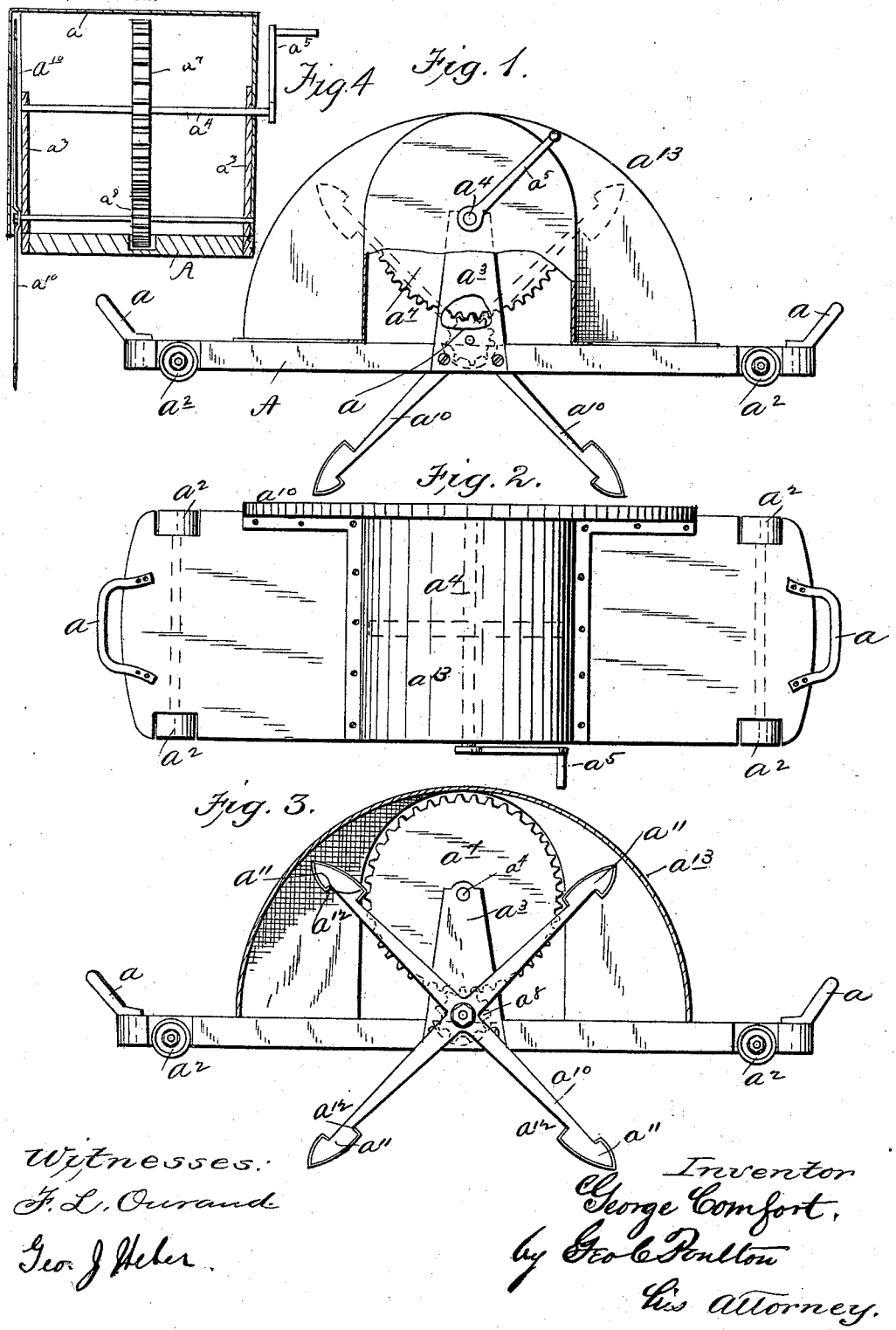
Witnesses:
F. L. Ourand
Geo. J. Heber
Inventor
George Comfort,
by Geo. C. Poulton
His Attorney.

UNITED STATES PATENT OFFICE.

GEORGE COMFORT, OF BOZEMAN, MONTANA.

HAY OR STRAW CUTTER.

SPECIFICATION forming part of Letters Patent No. 644,815, dated March 6, 1900.

Application filed December 22, 1899. Serial No. 741,336. (No model.)

*To all whom it may concern:*

Be it known that I, GEORGE COMFORT, a citizen of the United States, residing at Bozeman, in the county of Gallatin and State of Montana, have invented certain new and useful Improvements in Hay or Straw Cutters; and I do declare the following to be a full, clear, and exact description of the invention, such as will enable others skilled in the art to which it appertains to make and use the same, reference being had to the accompanying drawings, and to the letters of reference marked thereon, which form a part of this specification.

The object of my invention is to provide a simple, efficient, and easily-operated machine for cutting out hay or straw piled in ricks or mows for feeding or baling purposes and one that may be readily repaired in case of injury or breakage of any of its parts.

The invention consists in the novel construction and combination of parts of a hay and straw cutter, as will be hereinafter fully described and claimed.

In the accompanying drawings, forming a part of this specification and in which like letters of reference indicate corresponding parts, Figure 1 is a view in side elevation, partly in section. Fig. 2 is a view in top plan. Fig. 3 is a view in side elevation, the casing being broken away to show the operating mechanism. Fig. 4 is a transverse vertical section.

Referring to the drawings, A designates the base of the machine, the same being constructed of any suitable material, such as a piece of solid wood.

At each end and on top of the base is secured a handle $a$ to facilitate handling the device, and on each side of both ends are provided wheels or rollers $a^2$, revolving on suitable shafts, by which the device may readily be moved over the rick of hay.

Mounted on the sides of the base about midway of its length are two standards $a^3$, in which is journaled a shaft $a^4$, carrying at one end a crank $a^5$. This shaft carries a gear $a^7$, which meshes with a pinion $a^8$ on a shaft $a^9$, the latter being also journaled in the standards $a^3$. Mounted upon this latter shaft, on one end, is a cutter $a^{10}$, the same being provided in this instance with four arms, each carrying at its extremity a double knife-edged cutter $a^{11}$, each cutting edge of the head terminating with an abrupt sharp shoulder $a^{12}$, forming an abutment, the latter being also edged in order to form a cutting edge. The arms $a^{10}$ and heads $a^{11}$ shear against one side of the base, whereby to effect rapid and effective cutting, the standards $a^3$ being inset in order to obviate the presentation of an obstruction to the knives, which latter are made removable for the purpose of being sharpened.

The operation of the implement is as follows: The operator grasps one of the handles $a$ with one hand and suspends the device at an angle over one side of the rick, while with the other hand the crank $a^5$ is turned, whereby through the gear $a^7$ and pinion $a^8$ the cutters are rapidly turned. The device travels transversely of the rick until the opposite side thereof is reached, thereby cutting a flush surface from one side of the rick to the other. The rotation of the cutters is then reversed, and the same operation is repeated until the machine reaches the place of beginning—*i. e.*, the machine is moved backward and forward to cut from one side of said rick to the other.

By the peculiar form of the cutter knife-heads reversal of the cutting operation may be effected in the manner described. In order to shield the gearing from dust and moisture, a covering $a^{13}$ is employed, which may be of any material desired.

Having thus fully described my invention, what I claim as new, and desire to secure by Letters Patent, is—

1. A hay or straw cutter of the character described, comprehending a portable base provided with handles for moving it and having oppositely-disposed standards at the sides thereof, two shafts journaled in said standards, one of said shafts having a pinion fixed thereon, and carrying at its projecting end, at the side of the base, a rotary cutter, the other of said shafts being provided with a crank-handle and having a driving-gear thereon in mesh with said pinion, substantially as shown and for the purpose set forth.

2. A device of the character described, comprising a portable base carrying a handle at each end, and rollers at the sides of the ends, standards secured to the base intermediate of its ends, transverse shafts journaled in the standards, one of which shafts carries a gear-wheel and the other a pinion in mesh therewith, a crank carried by one shaft, cutter-arms carried by the other shaft, the arms being provided with double-edged cutting-heads, and a casing inclosing the gearing, substantially as described.

3. A portable cutter for cutting hay or straw out of ricks or mows, the combination with a frame, adapted to be moved in either direction, and furnishing an abutment against which the cutters may operate, a shaft adapted to be revolved in either direction at will, and having mounted thereon a series of arms, the outer extremities of which are provided with knives, having shoulders, arranged one above the other, and on opposite sides, the shoulders serving as cutter-heads, substantially as specified.

In testimony whereof I affix my signature in presence of two witnesses.

GEORGE COMFORT.

Witnesses:
GEO. C. POULTON,
J. J. NELLIGAN.